United States Patent [19]
Anstey

[11] 3,946,356
[45] Mar. 23, 1976

[54] SYNTHETIC DISPLAY OF SEISMIC REFLECTION STRENGTH

[75] Inventor: Nigel A. Anstey, Sevenoaks, England

[73] Assignee: Seiscom Delta Inc.

[22] Filed: Feb. 22, 1974

[21] Appl. No.: 444,749

[52] U.S. Cl. ... 340/15.5 SS; 340/15.5 DS; 346/33 C
[51] Int. Cl.² .......................................... G01V 1/00
[58] Field of Search 340/15.5 DS, 15.5 SS, 15.5 TG; 35/41, 51; 346/33 C

[56] References Cited
UNITED STATES PATENTS

| | | | |
|---|---|---|---|
| 2,767,388 | 10/1956 | Rust, Jr. | 346/33 C |
| 3,243,821 | 3/1966 | Bogs et al. | 346/109 |
| 3,668,618 | 6/1972 | Quay | 340/15.5 DS |
| 3,671,929 | 6/1972 | Ruehle et al. | 340/15.5 DP |

OTHER PUBLICATIONS

Sengbush et al., *Geophysics*, Vol. XXVI, No. 2, 4-1961, pp. 138-157.

*Primary Examiner*—Maynard R. Wilbur
*Assistant Examiner*—S. C. Buczinski
*Attorney, Agent, or Firm*—Pravel & Wilson

[57] ABSTRACT

A synthetic display is provided, in cross-sectional form, of the theoretical strength of seismic reflections. The theoretical strength is computed from calculated inverval-velocity values and known or estimated density values. By comparison of this synthetic reflection-strength display with the observed reflection-strength display, useful conclusions may be drawn about the nature of geological materials and the complex origin of reflections.

17 Claims, 3 Drawing Figures

SYNTHETIC DISPLAY OF SEISMIC REFLECTION STRENGTH

BACKGROUND OF THE INVENTION

1. Field of Invention

The present invention relates to display of seismic data, such as seismic reflection strength, for locating hydrocarbon deposits.

2. Description of Prior Art

Factors affecting the strength of seismic reflections are set out by O'Doherty and Anstey in the paper "Reflections of Amplitudes," Geophysical Prospecting, Volume XIX, No. 3, page 430.

It is known that variations of seismic reflection strength along a profile or over a survey may be due to several causes; among others, they are sometimes associated with focusing effects, sometimes with interference effects, sometimes with highly absorptive regions above the reflector, and sometimes with change in the physical properties of the material above or below the reflecting interface. One circumstance which is of interest in connection with the last of these causes is that of hydrocarbon saturation, which can produce significant changes in the physical properties of a reservoir rock. Such changes produce variations in reflection strength if they include changes in the seismic velocity and/or density of the rock.

In the direct location of hydrocarbons by the seismic method, therefore, it becomes important to establish whether observed changes of reflection strength are due to changes of velocity and/or density, or to other effects.

SUMMARY OF THE INVENTION

Briefly, the present invention provides a new and improved method of making a synthetic seismic section which can be compared with observed seismic sections to assist in locating hydrocarbon deposits. The synthetic section is based on seismic velocity characteristics of seismic signals in intervals between seismic horizons of significant interest, from which a synthetic representation of seismic signal strength is formed.

The synthetic representation of signal strength is formed according to ratios derived from the seismic velocity characteristics of the signals in the layers or based on reflection coefficients of the seismic horizons using the seismic velocity characteristics and a probable value of density of the layers adjacent the seismic horizons. Plural synthetic representations based on the velocity characteristics and a range of probable values of the densities of the layers are additionally suitable for use with the present invention.

The synthetic representation of signal strength so formed is displayed in the form of a seismic section which may be superimposed on the observed seismic section, if desired. Further, the synthetic representation may be displayed as a color superposition on the observed seismic section, or as a three-dimensional seismic display. The synthetic section is then available as an analytic aid for analysis and evaluation of the observed section to assist in locating hydrocarbon deposits.

The present invention also provides a method for the direct location of hydrocarbon-saturated rocks exhibiting low velocity and/or density.

It is an object of the present invention to combine measurements of seismic velocity within layers and estimated or trial values of the density of the layers in order to construct theoretical or synthetic sections showing the strength of the reflections from the interfaces between the layers.

A further object of the present invention is to provide a synthetic display of reflection strength which may be compared with a display of observed reflection strength, and thereby used to identify anomalous densities or other anomalous rock properties.

A further object is to provide a display which allows such comparisons to be quantitative, by the representation of the synthetic and observed reflection strengths in calibrated colors.

A further object is to relate the synthetic and observed reflection strengths by referring them both to a fiducial reflection such as that from the bottom of the sea.

DESCRIPTION OF THE PREFERRED EMBODIMENT

Figure 1:
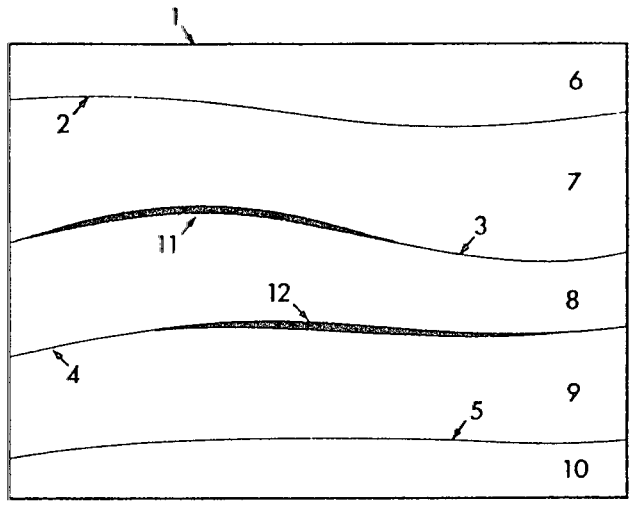
FIG. 1 represents an observed seismic cross-section in which the reflection strength indications are preserved.

It is well known that the first factor affecting the strength of a reflection from an interface or seismic horizon is the reflection coefficient, defined as:

$$\frac{V_2 d_2 - V_1 d_1}{V_2 d_2 + V_1 d_1}$$

where $V$ represents seismic velocity, $d$ represents density, and the subscripts 1 and 2 denote the regions or intervals above and below the interface, respectively. Therefore if the interval velocity $V$ and the density $d$ are known as a continuous function of reflection time at every observation point, a theoretical measure of approximate reflection strength may be computed for each such point.

Using current techniques of velocity analysis it is possible to compute interval velocity, under some restrictive but reasonable assumptions, as a continuous or partially-continuous function of reflection time and of position along a profile. However, the density of buried rock cannot be measured, on a layer-by-layer basis, by any surface method currently in practice. Thus, evaluation of seismic data to locate hydrocarbons based on reflection strength in observed seismic sections has been subjective and intuitive since the relative effects on reflection strength of interval velocity and density cannot be allocated.

With the present invention, synthetic representations of seismic signal strength are formed into a synthetic seismic section based on seismic velocity characteristics of seismic signal sections which can be used as a basis for comparison with observed seismic sections to more accurately evaluate the velocity and density of the layers in the seismic section.

As will be set forth below, probable values of the density of subsurface layers may be approximated based on the circumstances regarding the area surveyed and regarding the data from the survey.

The best technique for approximating probable values of the density varies with the circumstances. In cases where a borehole has been logged with a borehole gravimeter, the density is known fairly accurately as a function of depth and geological composition. In cases where a borehole has been logged with a so-called density log, an approximation to the density is known for the adulterated region close to the hole. In cases where the geologic sequence is well known, realistic values of density may be ascribed directly to geologic units. In other cases one may assume a relation of the form $$d = kV^a$$

where empirical values for the constants k and a may be ascribed. In the unique case of the surface layer (particularly if it is water) the density is known or may be measured directly.

With values of velocity and density obtained as above for each major layer, the reflection coefficient of the interfaces between the layers can be computed from the equation above.

The present invention discloses a method of displaying the results of such calculations in continuous or substantially-continuous form, and thereby of comparing such computed values for approximate reflection strength with the observed values. This method is of particular utility if realized with display techniques in color, and is further enhanced if the displays are in the form of a three-dimension seismic display.

Advantageous methods of displaying reflection strength superimposed on a normal seismic cross-section are set out in copending U.S. Pat. application Ser. No. 300,672, filed Oct. 25, 1972, and a preferred form of such display in color is set out in copending U.S. Pat. application Ser. No. 300,718, filed Oct. 25, 1972, both of which are assigned to the assignee of the present invention. The use of such displays, particularly the color displays, to form three-dimensional representations of the earth is set out in copending U.S. Pat. application Ser. No. 441,023, filed Feb. 11, 1974, based on British Provisional Specification No. 7187/73, filed Feb. 14, 1973, and also assigned to the present assignee. By the techniques of these disclosures, the variations of reflection strength along a profile or over an area can be assessed easily and quantitatively.

In the seismic cross-section 1 of FIG. 1 representing an observed section from a seismic survey after conventional seismic data processing, the horizontal dimension represents distance along a profile and the vertical dimension represents reflection time. Four reflections or horizons are depicted: that from the sea bottom 2, and three deeper reflections 3, 4 and 5. These reflections represent interfaces between five layers 6, 7, 8, 9 and 10 (of which the first is the sea itself, in this example). The reflection 3 exhibits a region 11 of locally marked strength, while the reflection 4 has an apparently similar strong region at 12. As disclosed in the aforesaid copending applications, the strength indication may be made as a color modulation superimposed on a conventional cross-section; this represents a preferred usage for present purposes, although the invention is not restricted to color displays, since black-and-white displays may also be used.

Figure 2:
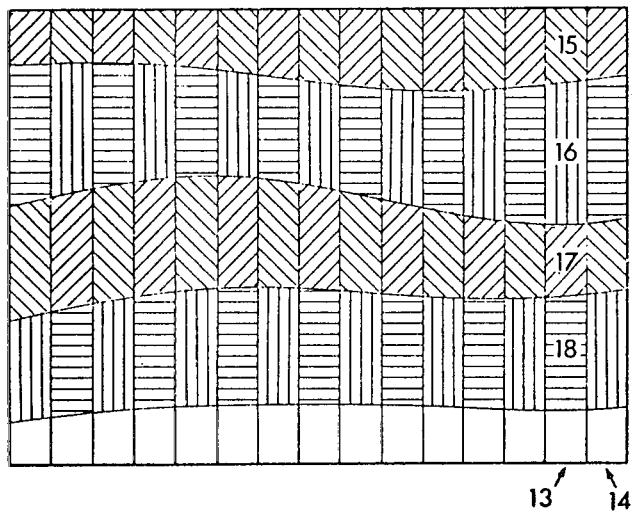
FIG. 2 represents the results of an intervalvelocity analysis, displayed in superimposition on the seismic section.

FIG. 2 is a diagrammatic representation of the results of a velocity analysis on the basic data of FIG. 1. For purposes of example it is assumed that an analysis is available for each of the vertical slices typified by 13 and 14 in FIG. 2; each analysis may use all of the seismic ray-paths within the slice, or some fraction of that number, and the slice may be of any desired practicable width. From these analyses it is possible, by techniques well known in the art, to compute the interval velocities within each slice which may be ascribed to the intervals 6, 7, 8 and 9, between their respective interfaces. In this way an independent value of interval velocity is associated with each hatched region in FIG. 2.

It follows that, within each slice, in the section 1, a calculated velocity is available for the material above and below each of the interfaces 2, 3 and 4. In slice 13, for example, interface 2 is shown between sections of slice 13 having velocities indicated by shaded areas 15 and 16, interface 3 between sections of slice 13 having velocities indicated by shaded areas 16 and 17, and interface 4 between sections of slice 13 having velocities indicated by shaded areas 17 and 18. Therefore, a first approximation to the reflection coefficient of these interfaces may be calculated, to form a synthetic representation of seismic signal strength, by ignoring the densities, and by computing for each interface a synthetic seismic signal strength in the form of the difference of the velocities below and above divided by the sum of the velocities below and above (in accordance with the first equation quoted hereinbefore). This value so calculated may then be displayed by being plotted as a synthetic reflection strength on the new display of FIG. 3, in the appropriate positions 19, 20 and 21. Preferably, FIG. 3 takes the form of a conventional seismic section similar to that which forms the basis of FIG. 1, and the synthetic reflection strengths computed as described above are superimposed on this display in the form of a color modulation, using the techniques of the copending application referred to above. It should be understood that other display techniques may be used to display the synthetic reflection strength, if desired.

Figure 3:
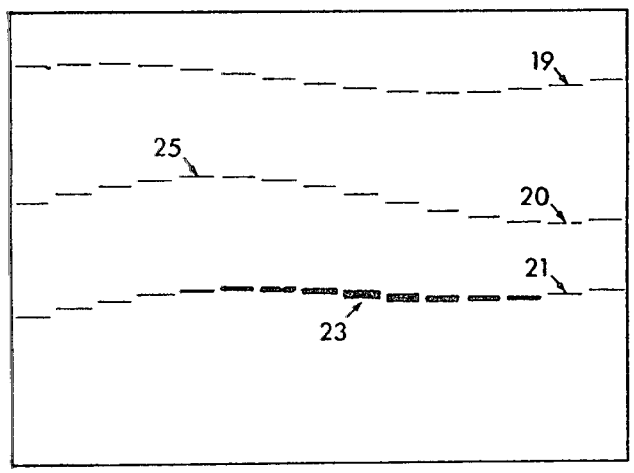
FIG. 3 represents a synthetic reflection-strength display according to the present invention.

In this way, FIG. 1 represents a basic observed section on which the observed reflection strengths are superimposed in color, and FIG. 3 represents the same basic section on which the theoretical reflection coefficients are superimposed in color. Comparison between the two is therefore very straightforward.

As noted earlier, the reflection coefficients can be approximated more closely if an estimate may be made of the densities as well as of the velocities. Also as noted earlier, this estimate may be based on known characteristics of the rocks comprising the geological sequence, or on generalizations relating density and velocity.

In the example illustrated in the figures, the density of layer 6 is known (being that of sea water) and that of layer 7 can usually be estimated from its nature, or from cores or other local measurements. Therefore the reflection coefficient of the sea bottom can be established fairly accurately. It is an important feature of the present invention that the strength representations of FIGS. 1 and 3 may be related to or normalized by the same reference or fiducial strength: that of the water-bottom reflection. For example, each trace on FIG. 1 may be scaled by a multiplier such that the strength of its water-bottom reflection is set equal to that of the water-bottom reflection coefficient at the corresponding place on FIG. 3; it follows that the strength indications given by later reflections on FIG. 1 are numerically representative of apparent reflection coefficients ("apparent" in the sense that no corrections are incorporated at this stage for transmission losses, absorption and interference effects).

Since the correctness of the measure of water-bottom reflection coefficient is important in this connection, other observations may be introduced to check the measurement. For example, this reflection coefficient may be derived also from studying the ratio between primary and multiple reflections from the sea bottom, or from the auto-correlation function of a suitable part of the reflection traces. Further, the effective velocity of the material in the sea bottom may be checked by studying on the field records the increases of amplitude which occur when the water-bottom reflection is at the critical angle.

Either with or without the above steps concerned with the water bottom reflections, the display of FIG. 3 may now be compared with that of FIG. 1. The figures illustrate two situations that are of particular interest. Reflection 4 of FIG. 1 exhibits a localized region 12 of strength significantly greater than on other regions of the same reflection; the interpreter therefore checks whether the same phenomenon is observed over the corresponding region 23 of FIG. 3, and finds that it is. This increase of reflection strength, consequently, is to be expected from the velocity and density measurements, and is not anomalous. However, there is a similar strong region 11 on reflection 3 of FIG. 1, which does not have a counterpart at 25 in FIG. 3. This is an anomalous situation which may be diagnostic of hydrocarbons. To check this possibility, the interpreter, having satisfied himself that the velocities used in the generation of FIG. 3 are properly calculated, over an appropriate interval, may have new versions of the synthetic section of FIG. 3 formed using different velocity and/or density values in the vicinity of the reflection 20 over the region 25. It may be found on further analysis, for example, that the anomalous strength on FIG. 1 can be matched on FIG. 3 only be postulating a local depression of velocity and/or density of magnitude, for which the the most likely cause would be gas saturation in this subsurface region.

Before making such inferences, the interpreter must satisfy himself that the local increase of reflection strength at 11 is not due to focusing effects associated with reflector curvature, and must assess the relevance of interference effects between closely-spaced reflections of both primary and multiple nature. If the synthetic strength information is displayed as a color superposition on the basic seismic reflection section, as hereinbefore disclosed, all the information required for these judgements is available to the interpreter on a single sheet. This is an important feature of the present invention.

In order to maximize the general similarity of appearance between the observed and the synthetic strength sections, it is preferred to pass the theoretical reflection-coefficient values, which are known as "spikes" in the art, through a filter which imparts to them the approximate form of seismic reflections. For example, the reflection-coefficient spikes for the entire section of FIG. 3 may be passed through the same space-variant and time-variant filter which has been applied to the field data used in the construction of the observed section of FIG. 1. Care must be taken, of course, to insure that the scaling of filter operators used in these cases are appropriate to the circumstances. Then the reflection strength, both observed and synthetic, may be computed by a standard technique from the filtered or unfiltered data, according to the teachings of the aforesaid copending Applications.

Alternatively, the spikes of synthetic reflection strength may be enlarged in time duration, that is, replaced by rectangular "box-car" functions, in order to increase their visual clarity.

Synthetic strength representations prepared in sectional form by the techniques of the present invention may additionally be assembled advantageously into three-dimensional representations in accordance with the teachings of the aforesaid copending Application as a further aid to analysis.

Although the invention has been described in terms of the gross interval velocities measured between major seismic reflectors, it also encompasses the use of velocities modified to accommodate any known or estimated variation of local velocity with depth of past or present burial.

The foregoing disclosure and description of the invention are illustrative and explanatory thereof, and various changes in the size, shape, and materials as well as in the details of the illustrated construction may be made without departing from the spirit of the invention.

I claim:
1. A method of making a synthetic seismic section from seismic interval velocity characteristic of seismic signals in intervals between seismic horizons for analysis of an observed seismic time or depth section, comprising the steps of:
   a. forming a synthetic representation of seismic signal strength for the seismic horizon by forming a ratio of the difference between interval velocities in intervals adjacent the seismic horizons to the sum of interval velocities in intervals adjacent the seismic horizons; and
   b. displaying the synthetic representation of seismic signal strength for the horizons in the form of a seismic section.

2. The method of claim 1, wherein said step of displaying comprises the step of:
   superimposing the synthetic representation of seismic signal strength on the observed seismic section.

3. The method of claim 1, wherein said step of displaying comprises the step of:
   displaying the synthetic representation of seismic signal strength as a color superposition on the observed seismic section.

4. The method of claim 1, further including the step of:
   displaying the reflection strength of the observed section in color.

5. The method of claim 1, wherein said step of displaying comprises the step of:
   displaying the reflection strength of the observed section in color, wherein the synthetic representation may be compared with the reflection strength of the observed section.

6. The method of claim 1, further including the steps of:
   displaying the reflection strength of the observed section.

7. The method of claim 6, further including the step of:
   normalizing both the synthetic representation of signal strength and the reflection strength of the observed section by the strength of a fiducial reflection.

8. The method of claim 1, further including the step of:
filtering the synthetic representation of signal strength to impart thereto the general character of an observed seismic reflection in the observed section.

9. A method of making a synthetic seismic section indicating reflection strength of seismic reflectors in an observed time or depth seismic section utilizing the following steps:
   a. computing the seismic velocity in the zones above and below the seismic reflectors;
   b. computing for each reflector a synthetic reflection strength characteristic which is given by the difference of the velocities above and below the reflector divided by the sum of the velocities above and below the reflector; and
   c. displaying the synthetic reflection strength characteristic superimposed upon the observed seismic section.

10. A method of making a synthetic seismic section from seismic interval velocity characteristics of seismic signals in layers between seismic horizons for analysis of an observed seismic time or depth section, comprising the steps of:
   a. forming a synthetic representation of seismic signal strength for the seismic horizons by forming a synthetic reflection coefficient for the horizons by performing the steps of:
      1. forming the product of the interval velocity characteristic and a probable value of density for each of the layers adjacent the seismic horizons; and
      2. forming a ratio of the difference to the sum of the products formed of the interval velocity characteristic and probable value of density for the layers adjacent the seismic horizons to thereby form the synthetic representation of seismic signal strength; and
   b. displaying the synthetic representation of signal strength for the horizons in the form of a seismic section.

11. The method of claim 10, wherein said step of displaying comprises the step of:
superimposing the synthetic representation of signal strength on the observed seismic section.

12. The method of claim 10, wherein said step of displaying comprises the step of:
displaying the synthetic representation of signal strength as a color superposition on the observed seismic section.

13. The method of claim 10, further including the step of:
displaying the reflection strength of the observed section in color.

14. A method of making a synthetic seismic section from seismic interval velocity characteristics of seismic signals in layers between seismic horizons for analysis of an observed seismic time or depth section, comprising the steps of:
   a. forming a synthetic representation of seismic signal strength for the horizons by forming a plurality of synthetic representations of signal strength at the seismic horizons by performing the steps of:
      1. forming the product of the interval velocity characteristic and a range of probable values of densities for each of the layers adjacent the seismic horizons; and
      2. forming ratios of the difference to the sum of the products formed of the interval velocity characteristic and probable values of density for the layers adjacent the seismic horizons to thereby form the synthetic representation of seismic signal strength; and
   b. displaying the synthetic representation of signal strength for the seismic horizons in the form of a seismic section.

15. The method of claim 14, wherein said step of displaying comprises the step of:
superimposing the synthetic representation of signal strength on the observed seismic section.

16. The method of claim 14, wherein said step of displaying comprises the step of:
displaying the synthetic representation of signal strength as a color superposition on the observed seismic section.

17. The method of claim 14, further including the step of:
displaying the reflection strength of the observed section in color.

* * * * *